United States Patent
Minami et al.

(10) Patent No.: US 12,519,807 B2
(45) Date of Patent: Jan. 6, 2026

(54) RELAY DEVICE AND RELAY METHOD

(71) Applicant: Mitsubishi Electric Corporation, Tokyo (JP)

(72) Inventors: Tatsunori Minami, Tokyo (JP); Teruyoshi Yamaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 799 days.

(21) Appl. No.: 17/783,645

(22) PCT Filed: Jan. 15, 2020

(86) PCT No.: PCT/JP2020/001045
§ 371 (c)(1),
(2) Date: Jun. 9, 2022

(87) PCT Pub. No.: WO2021/144880
PCT Pub. Date: Jul. 22, 2021

(65) Prior Publication Data
US 2023/0007019 A1   Jan. 5, 2023

(51) Int. Cl.
*H04L 9/40*   (2022.01)
*H04L 41/16*   (2022.01)

(52) U.S. Cl.
CPC ......... *H04L 63/1416* (2013.01); *H04L 41/16* (2013.01); *H04L 63/0263* (2013.01)

(58) Field of Classification Search
CPC . H04L 63/1416; H04L 41/16; H04L 63/0263; H04L 47/00
See application file for complete search history.

(56) References Cited

U.S. PATENT DOCUMENTS

2006/0010389 A1\* 1/2006 Rooney ............... H04L 63/1458
715/736
2014/0289856 A1\* 9/2014 Jiang ..................... G06F 21/552
726/23
(Continued)

FOREIGN PATENT DOCUMENTS

CN   100370757 C   2/2008
CN   105530255 A   4/2016
(Continued)

OTHER PUBLICATIONS

Suga, Toki, Kazuya Okada, and Hiroshi Esaki. "Toward real-time packet classification for preventing malicious traffic by machine learning." 2019 22nd Conference on Innovation in Clouds, Internet and Networks and Workshops (ICIN). IEEE, 2019. (Year: 2019).\*
R. Burton and L. Rocha, "Whitelists that Work: Creating Defensible Dynamic Whitelists with Statistical Learning," 2019 APWG Symposium on Electronic Crime Research (eCrime), Pittsburgh, PA, USA, 2019, pp. 1-10 (Year: 2019).\*
(Continued)

*Primary Examiner* — Jung W Kim
*Assistant Examiner* — Sameera Wickramasuriya
(74) *Attorney, Agent, or Firm* — XSENSUS LLP

(57) ABSTRACT

A relay device includes a first input/output unit (111), a second input/output unit (112), a security monitoring unit (121) that determines whether or not a packet input to the first input/output unit (111) or the second input/output unit (112) is normal, and a relay unit (113) that outputs a packet determined to be normal by the security monitoring unit (121) from the first input/output unit (111) or the second input/output unit (112); the security monitoring unit (121) uses a whitelist to perform whitelist-based attack detection to determine whether or not a packet is normal, and uses a learning model learned through machine learning to perform machine-learning-based attack detection on a packet that is not determined to be normal through the whitelist-based attack detection, to determine whether or not the packet is normal.

14 Claims, 11 Drawing Sheets

(56) References Cited

U.S. PATENT DOCUMENTS

| | | | |
|---|---|---|---|
| 2017/0109667 A1* | 4/2017 | Marcu | G06F 9/4843 |
| 2017/0109668 A1* | 4/2017 | Marcu | G06F 8/30 |
| 2017/0230396 A1* | 8/2017 | Hamada | H04L 63/029 |
| 2018/0054418 A1* | 2/2018 | El Defrawy | H04L 63/10 |
| 2019/0052674 A1* | 2/2019 | Wada | H04L 63/1475 |
| 2019/0166139 A1* | 5/2019 | Ochi | H04L 63/1416 |
| 2019/0207973 A1* | 7/2019 | Peng | G06F 21/577 |
| 2020/0184278 A1* | 6/2020 | Zadeh | G06N 3/044 |
| 2021/0203660 A1* | 7/2021 | Nagayama | H04L 63/101 |

FOREIGN PATENT DOCUMENTS

| | | | | |
|---|---|---|---|---|
| CN | 106713371 A | * | 5/2017 | H04L 61/1511 |
| CN | 108111472 A | | 6/2018 | |
| CN | 108933731 A | | 12/2018 | |
| CN | 106559382 B | | 10/2019 | |
| JP | 2001-34553 A | | 2/2001 | |
| JP | 2008-17179 A | | 1/2008 | |
| JP | 2017-5402 A | | 1/2017 | |
| JP | 2017005402 A | * | 1/2017 | |
| JP | 2017-143583 A | | 8/2017 | |
| WO | 2019/225710 A1 | | 11/2019 | |

OTHER PUBLICATIONS

Chinese Office Action issued Oct. 30, 2024 in connection with counterpart Chinese Patent Application No. 1 202080091166.2, 13pp.

International Search Report and Written Opinion mailed on Feb. 25, 2020, received for PCT Application PCT/JP2020/001045, filed on Jan. 15, 2020, 11 pages including English Translation.

Office Action mailed on Sep. 30, 2021, received for Taiwanese Application No. 109146454, 11 pages including English Translation.

Chinese Office Action issued Jun. 18, 2024, in corresponding Chinese Patent Application No. 202080091166.2.

Office Action issued on Sep. 22, 2022, in corresponding Indian patent Application No. 202247032527, 6 pages.

Japanese Office Action and English translation issued Nov. 29, 2022, in corresponding Japanese Patent Application No. 2021-571109, 8pp.

Chinese Office Action issued on Jan. 26, 2025, in corresponding Chinese Patent Application No. 202080091166.2, 10pp.

Office Action (Notice of decision of refusal) issued on Mar. 31, 2025 in connection with counterpart Chinese Patent Application No. 202080091166.2, 17pp.

* cited by examiner

FIG. 5

| No | TRANSMISSION SOURCE | TRANSMISSION DESTINATION | COMMAND | DEVICE ID |
|---|---|---|---|---|
| 1 | 192.168.0.1:50000 | 192.168.0.255:50000 | who-is | 100 |
| 2 | 192.168.0.2:50000 | 192.168.0.255:50000 | i-Am | 101 |
| 3 | 192.168.0.3:50000 | 192.168.0.255:50000 | i-Am | 102 |
| 4 | 192.168.0.4:50000 | 192.168.0.255:50000 | i-Am | 103 |
| ... | ... | ... | ... | ... |

DETECTION RULE 1 FOR who-is
DETECTION RULE 1 FOR i-Am
DETECTION RULE 2 FOR i-Am
DETECTION RULE 3 FOR i-Am
DETECTION RULES FOR OTHER COMMANDS

FIG. 6

| | DETECTION-RULE GENERATING DEVICE |
|---|---|
| TOTAL NUMBER OF PACKETS | 998,000 |
| TOTAL NUMBER OF DETECTION RULES | 21,660 |

| COMMAND TYPE | COMMUNI-CATION VOLUME RATIO | NUMBER OF DETECTION RULES | RATIO OF NUMBER OF DETECTION RULES | DETECTION RULE EFFICIENCY |
|---|---|---|---|---|
| who-is | 1.5% | 150 | 0.693% | 2.166 (ADOPTED) |
| i-Am | 1.5% | 100 | 0.462% | 3.249 (ADOPTED) |
| unconfirmedCOVNotification | 10% | 600 | 2.770% | 3.61 (ADOPTED) |
| unconfirmedEventNotification | 4.5% | 2500 | 11.542% | 0.390 |
| timeSynchronization | 13% | 10 | 0.0462% | 281.58 (ADOPTED) |
| writePropertyMultiple(REQ) | 2.5% | 800 | 3.693% | 0.677 |
| writePropertyMultiple(ACK) | 2.0% | 200 | 0.923% | 2.166 (ADOPTED) |
| readPropertyMultiple(REQ) | 2.0% | 1000 | 4.617% | 0.433 |
| readPropertyMultiple(ACK) | 2.0% | 500 | 2.308% | 0.866 |
| readProperty(REQ) | – | – | – | – |
| readProperty(ACK) | – | – | – | – |
| confirmedEventNotification(REQ) | 15% | 100 | 0.462% | 32.49 (ADOPTED) |
| confirmedEventNotification(ACK) | 15% | 700 | 3.232% | 4.641 (ADOPTED) |
| readRange(REQ) | 15.4% | 10000 | 46.168% | 0.334 |
| readRange(ACK) | 15.4% | 5000 | 23.084% | 0.667 |

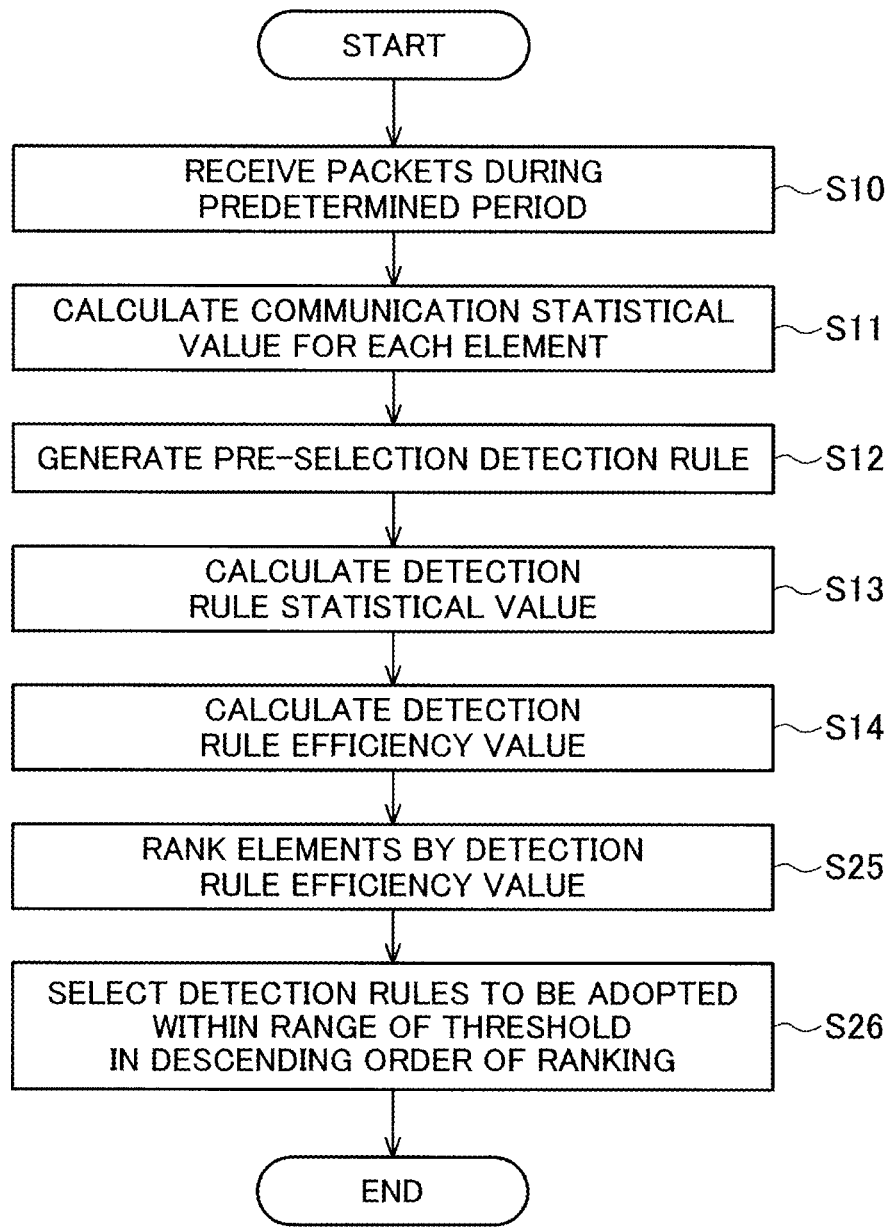

FIG. 8

| | DETECTION-RULE GENERATING DEVICE |
|---|---|
| TOTAL NUMBER OF PACKETS | 998,000 |
| TOTAL NUMBER OF DETECTION RULES | 21,660 |

| COMMAND TYPE | COMMUNI-CATION VOLUME RATIO | NUMBER OF DETECTION RULES | RATIO OF NUMBER OF DETECTION RULES | DETECTION RULE EFFICIENCY (RANKING) |
|---|---|---|---|---|
| who-is | 1.5% | 150 | 0.693% | 2.166 (6) |
| i-Am | 1.5% | 100 | 0.462% | 3.249 (5) |
| unconfirmedCOVNotification | 10% | 600 | 2.770% | 3.61 (4) |
| unconfirmedEventNotification | 4.5% | 2500 | 11.542% | 0.390 (12) |
| timeSynchronization | 13% | 10 | 0.0462% | 281.58 (1) ADOPTED |
| writePropertyMultiple(REQ) | 2.5% | 800 | 3.693% | 0.677 (9) |
| writePropertyMultiple(ACK) | 2.0% | 200 | 0.923% | 2.166 (7) |
| readPropertyMultiple(REQ) | 2.0% | 1000 | 4.617% | 0.433 (11) |
| readPropertyMultiple(ACK) | 2.0% | 500 | 2.308% | 0.866 (8) |
| readProperty(REQ) | — | — | — | — |
| readProperty(ACK) | — | — | — | — |
| confirmedEventNotification(REQ) | 15% | 100 | 0.462% | 32.49 (2) |
| confirmedEventNotification(ACK) | 15% | 700 | 3.232% | 4.641 (3) |
| readRange(REQ) | 15.4% | 10000 | 46.168% | 0.334 (13) |
| readRange(ACK) | 15.4% | 5000 | 23.084% | 0.667 (10) |

FIG. 11

| | DETECTION-RULE GENERATING DEVICE | | | | |
|---|---|---|---|---|---|
| TOTAL NUMBER OF PACKETS | 998,000 + 710,000 | | | | |
| TOTAL NUMBER OF DETECTION RULES | 21,660 + 2,250 | | | | |

| COMMAND TYPE | NUMBER OF PACKETS | NUMBER OF DETECTION RULES | COMMUNI-CATION VOLUME RATIO | RATIO OF NUMBER OF DETECTION RULES | DETECTION RULE EFFICIENCY (RANKING) |
|---|---|---|---|---|---|
| who-is | 15,000 + 8,000 | 150 | 1.347% | 0.621% | 2.169(⑥→⑦) |
| i-Am | 15,000 + 90,000 | 100 | 6.148% | 0.414% | 14.852(⑤→③) |
| unconfirmedCOVNotification | 100,000 + 25,000 | 600 | 7.319% | 2.483% | 2.947(④→⑤) |
| unconfirmedEventNotification | 45,000 + 2,000 | 2500 | 2.752% | 10.348% | 0.266(⑫→⑭) |
| timeSynchronization | 130,000 + 0 | 10 | 7.611% | 0.041% | 183.888(①→①) |
| writePropertyMultiple(REQ) | 25,000 + 1,000 | 800 | 1.522% | 3.311% | 0.460(⑨→⑬) |
| writePropertyMultiple(ACK) | 20,000 + 1,000 | 200 | 1.230% | 0.828% | 1.485(⑦→⑧) |
| readPropertyMultiple(REQ) | 20,000 + 80,000 | 1000 | 5.855% | 4.139% | 1.415(⑪→⑨) |
| readPropertyMultiple(ACK) | 20,000 + 80,000 | 500 | 5.855% | 2.070% | 2.829(⑧→⑥) |
| readProperty(REQ) [DETECTION RULE ADDED FOR NEW COMMAND] | 0 + 10,000 | 0 + 2000 | 0.585% | 8.278% | 0.071( →⑮) |
| readProperty(ACK) | 0 + 10,000 | 0 + 250 | 0.585% | 1.035% | 0.566( →⑪) |
| confirmedEventNotification(REQ) | 150,000 + 1,500 | 100 | 8.870% | 0.414% | 21.430(②→②) |
| confirmedEventNotification(ACK) | 150,000 + 1,500 | 700 | 8.870% | 2.897% | 3.061(③→④) |
| readRange(REQ) | 154,000 + 200,000 | 10000 | 20.726% | 41.391% | 0.501(⑩→⑫) |
| readRange(ACK) | 154,000 + 200,000 | 5000 | 20.726% | 20.695% | 1.001(⑩→⑩) |

RELAY DEVICE AND RELAY METHOD

CROSS-REFERENCE TO RELATED APPLICATION

The present application is based on PCT filing PCT/JP2020/001045, filed Jan. 15, 2020, the entire contents of which is incorporated herein by reference.

TECHNICAL FIELD

The disclosure relates to a relay device and a relay method.

BACKGROUND ART

Conventional network-based attack detection for control systems includes whitelist-based attack detection that uses preliminarily defined detection rules for detecting packets that do not require caution and determines packets that do not fall under the rules as attacks (for example, refer to Patent Literature 1).

PRIOR ART REFERENCE

Patent Reference

Patent Literature 1: Japanese Patent Application Publication No. 2001-034553

SUMMARY OF THE INVENTION

Problem to be Solved by the Invention

For conventional whitelist-based attack detection, detection rules need to be designed even for packets that are rarely transmitted. In some cases, such a design requires a large number of detection rules to be written, and this may lead to increased creation costs and decreased performance.

Accordingly, it is an object of the disclosure to prevent an increase in the creation cost of detection rules.

Means of Solving the Problem

A relay device according to an aspect of the disclosure includes a first input/output unit connected to a first network; a second input/output unit connected to a second network; a monitoring unit configured to determine whether or not a packet input to the first input/output unit or the second input/output unit is normal; and a relay unit configured to output a packet determined to be normal by the monitoring unit to the first input/output unit or the second input/output unit, wherein the monitoring unit uses a whitelist to perform whitelist-based attack detection to determine whether or not the packet input to the first input/output unit or the second input/output unit is normal and uses a learning model learned through machine learning to perform machine-learning-based attack detection on a packet not determined to be normal through the whitelist-based attack detection, to determine whether or not the packet is normal, the whitelist being a list of detection rules indicating elements that allow determination of normality of the packet out of elements of a feature of the packet.

A relay method according to an aspect of the disclosure includes inputting a packet to a first input/output unit connected to a first network or a second input/output unit connected to a second network; determining whether or not a packet input to the first input/output unit or the second input/output unit is normal; and outputting a packet determined to be normal from the first input/output unit or the second input/output unit, wherein, when the packet input to the first input/output unit or the second input/output unit is to be determined to be normal or not, a whitelist is used to perform whitelist-based attack detection to determine whether or not the packet input to the first input/output unit or the second input/output unit is normal, and a learning model learned through machine learning is used to perform machine-learning-based attack detection to determine whether or not a packet not determined to be normal through the whitelist-based attack detection is normal, the whitelist being a list of detection rules indicating elements that allow determination of normality out of elements of a feature of the packet.

Effects of the Invention

According to one or more aspects of the disclosure, an increase in the creation cost of detection rules can be prevented.

BRIEF DESCRIPTION OF THE DRAWINGS

FIG. 5 is a schematic diagram for explaining the outline of the processing of generating pre-selection detection rules by a detection-rule generating unit.

FIG. 6 is a schematic diagram for explaining example processing executed when a detection-rule selecting unit selects detection rules in the first embodiment.

FIG. 7 is a flowchart illustrating processing executed when the detection-rule generating device according to the second embodiment selects detection rules.

FIG. 8 is a schematic diagram for explaining example processing executed when a detection-rule selecting unit selects detection rules in the second embodiment.

FIG. 11 is a schematic diagram for explaining example processing executed when a detection-rule selecting unit updates post-selection detection rules in the third embodiment.

MODE FOR CARRYING OUT THE INVENTION

First Embodiment

Figure 1:
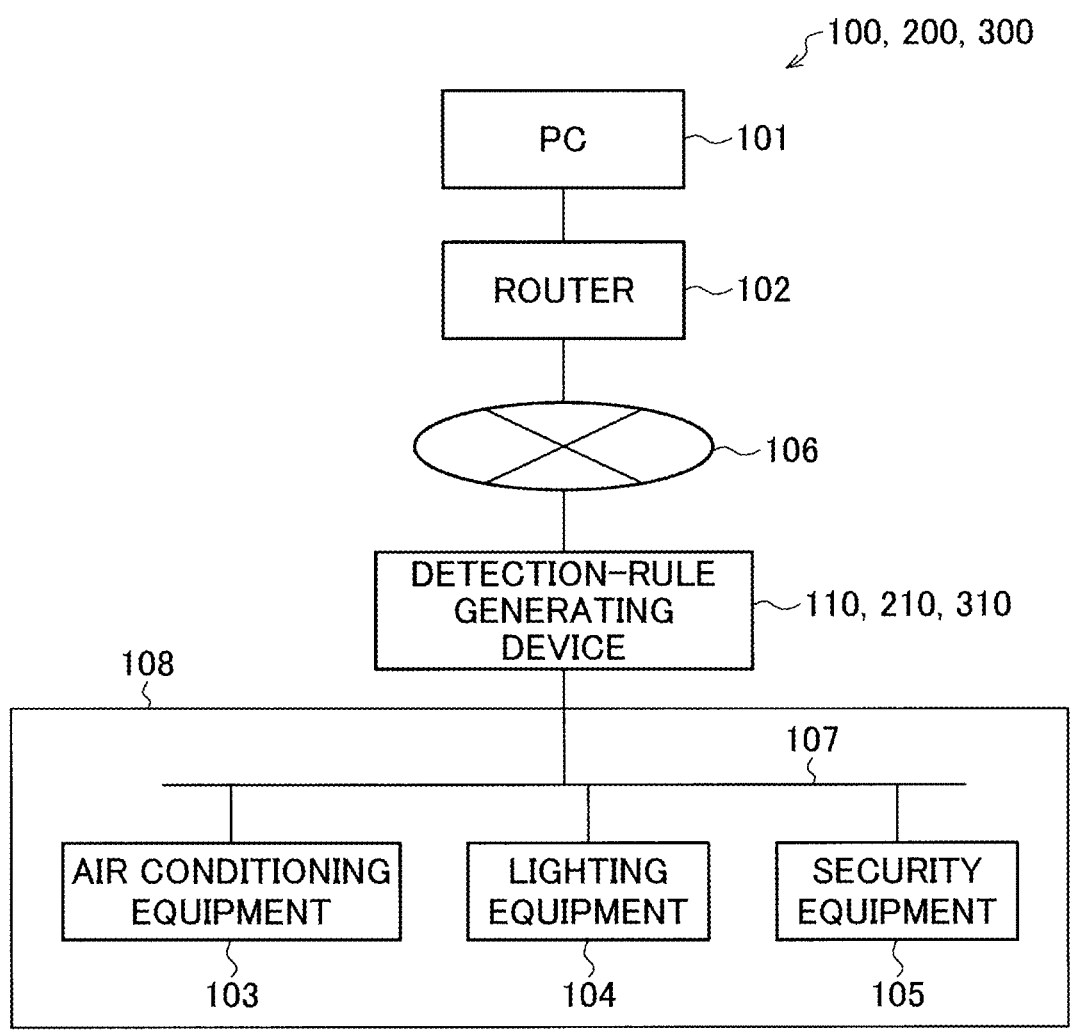
FIG. 1 is a block diagram schematically illustrating the configuration of a network system including a detection-rule generating device according to first to third embodiments.

FIG. 1 is a block diagram schematically illustrating the configuration of a network system 100 including a relay device or a detection-rule generating device 110 according to the first embodiment.

The network system 100 includes a personal computer (PC) 101, a router 102, a detection-rule generating device 110, air conditioning equipment 103, lighting equipment 104, and security equipment 105.

The PC 101 is connected to a first network or the Internet 106 via the router 102. The Internet 106 is a global network.

The detection-rule generating device 110 is connected to the Internet 106 and a second network or a local area network (LAN) 107.

The air conditioning equipment 103, the lighting equipment 104, and the security equipment 105, which are operation target devices to be operated by the PC 101, are connected to the LAN 107, but the operation target devices are not limited to such equipment. Note that the operation target devices connected to the LAN 107 constitutes an operation target system 108.

The PC 101 is an operation device used for operating the operation target equipment in the operation target system 108.

The router 102 is a relay device that relays data between a LAN (not illustrated) to which the PC 101 is connected and the Internet 106.

The detection-rule generating device 110 functions as a relay device that relays data between the Internet 106 and the LAN 107. For example, the detection-rule generating device 110 relays packets from the Internet 106 to the LAN 107.

In doing so, the detection-rule generating device 110 collects the packets transmitted from the PC 101 via the router 102 and the Internet 106 for a predetermined period to generate detection rules, and applies the generated detection rules to the detection-rule generating device 110 or another network-based attack detection device. Here, the predetermined period is also referred to as a first period.

The air conditioning equipment 103 regulates air conditioning within the organization provided with the LAN 107.

The lighting equipment 104 lights up a room in the organization provided with the LAN 107.

The security equipment 105 is a monitoring camera or the like in the organization provided with the LAN 107.

Figure 2:
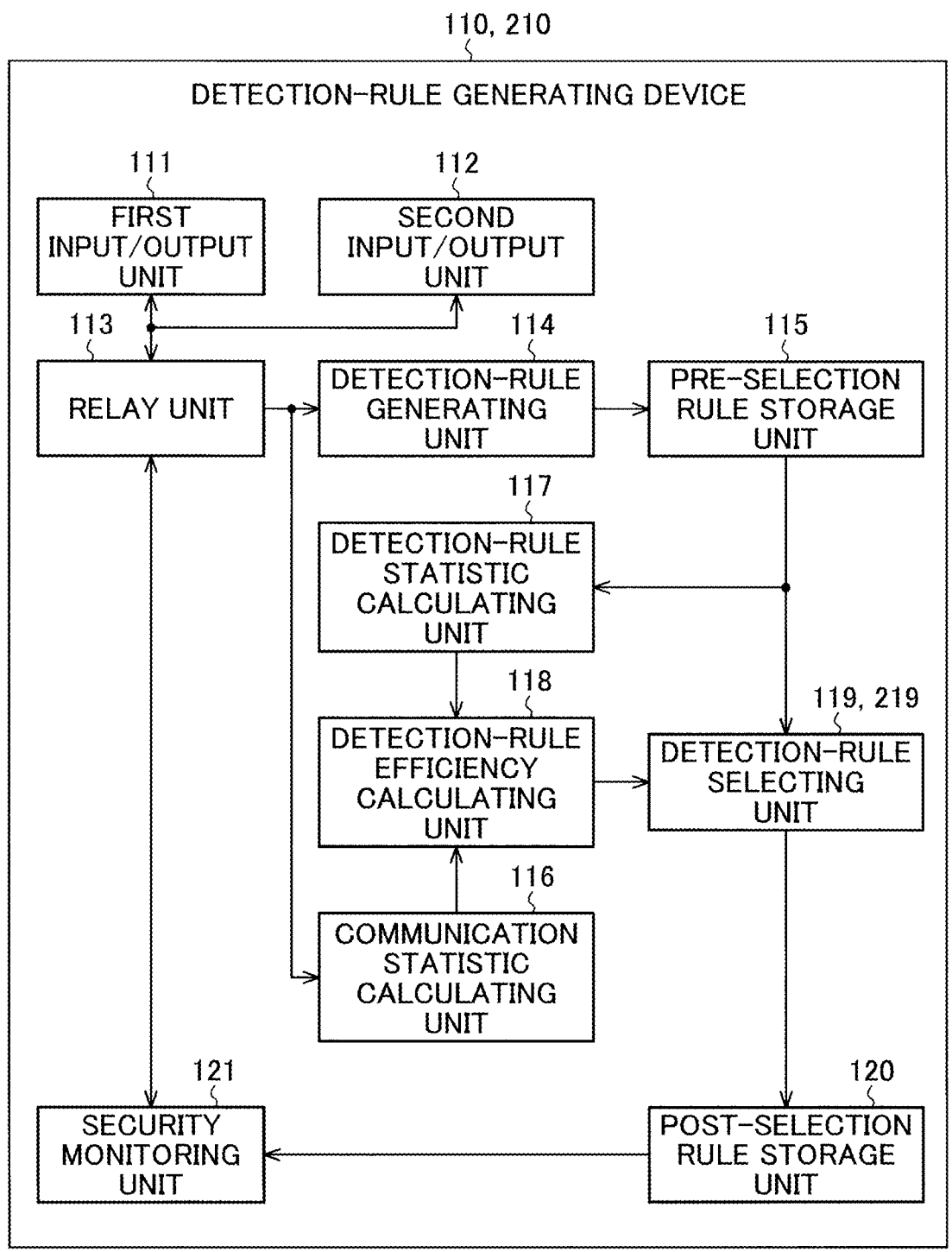
FIG. 2 is a block diagram schematically illustrating the functions of the detection-rule generating device according to the first and second embodiments.

FIG. 2 is a block diagram schematically illustrating the functions of the detection-rule generating device 110.

The detection-rule generating device 110 includes a first input/output unit 111, a second input/output unit 112, a relay unit 113, a detection-rule generating unit 114, a pre-selection rule storage unit 115, a communication statistic calculating unit 116, a detection-rule statistic calculating unit 117, a detection-rule efficiency calculating unit 118, a detection-rule selecting unit 119, a post-selection rule storage unit 120, and a security monitoring unit 121.

The first input/output unit 111 is connected to the Internet 106 and communicates through the Internet 106.

The second input/output unit 112 is connected to the LAN 107 and communicates through the LAN 107.

The relay unit 113 feeds the packets received by the first input/output unit 111 or the second input/output unit 112 to the security monitoring unit 121, and relays the packets determined to be normal by the security monitoring unit 121 so that the normal packets can be output from the first input/output unit 111 or the second input/output unit 112.

Moreover, the relay unit 113 feeds the packets received by the first input/output unit 111 to the detection-rule generating unit 114 and the communication statistic calculating unit 116 for a predetermined period in response to an instruction from an operator or the like of the detection-rule generating device 110.

The detection-rule generating unit 114 generates detection rules based on the packets fed from the relay unit 113. The detection-rule generating unit 114 stores the generated detection rules in the pre-selection rule storage unit 115 as pre-selection detection rules.

The pre-selection rule storage unit 115 stores the pre-selection detection rules.

Here, the pre-selection detection rules are all detection rule candidates for selecting the detection rules to be included in a whitelist used in whitelist-based attack detection.

The communication statistic calculating unit 116 calculates, from the packets fed from the relay unit 113, a communication statistical value that is the statistical value of communication for each element of one predetermined feature. The communication statistical value indicates, for each element, a scale of packets containing the corresponding element. For example, a communication volume ratio is calculated as the communication statistical value. The communication volume ratio is the ratio of the number of packets involving a corresponding element to the number of packets fed from the relay unit 113. The calculated communication statistical value is fed to the detection-rule efficiency calculating unit 118.

The detection-rule statistic calculating unit 117 calculates, from the pre-selection detection rules stored in the pre-selection rule storage unit 115, a detection rule statistical value that is a statistical value of detection rules for each element of one predetermined feature. The detection rule statistical value indicates, for each element, a scale of detection rules involving the element. For example, a detection rule number or the detection rule number ratio is calculated as the detection rule statistical value. The detection rule number is the number of detection rules involving a corresponding element included in the pre-selection detection rules. The detection rule number ratio is the ratio of the number of detection rules involving a corresponding element to the number of pre-selection detection rules. The calculated detection rule statistical value is fed to the detection-rule efficiency calculating unit 118.

The detection-rule efficiency calculating unit 118 calculates, from the communication statistical value and the detection rule statistical value, a detection rule efficiency value for each element of one predetermined feature. Here, the detection rule efficiency value is a value for evaluating the communication frequency of the detection rules; the detection rule efficiency is determined to be high when packets having a high communication frequency are detected with a small detection rule number. For example, the detection rule efficiency value is a value obtained by dividing the communication statistical value by the detection rule statistical value for each element. Specifically, the detection rule efficiency value is calculated as (communication volume ratio) (detection rule number) or (communication volume ratio) (detection rule number ratio). The calculated detection rule efficiency values are fed to the detection-rule selecting unit 119.

The detection-rule selecting unit 119 is a selecting unit that selects the detection rules to be included in the whitelist from the pre-selection detection rules stored in the pre-selection rule storage unit 115. For example, the detection-rule selecting unit 119 uses the detection rule efficiency values calculated by the detection-rule efficiency calculating unit 118 to select the detection rules having high detection rule efficiencies from the pre-selection detection rules stored in the pre-selection rule storage unit 115 as the detection rules to be left in a whitelist. The detection-rule selecting unit 119 then stores the selected detection rules in the post-selection rule storage unit 120 as post-selection detection rules.

The post-selection rule storage unit 120 stores post-selection detection rules. The post-selection detection rules are detection rules left in a whitelist.

The security monitoring unit 121 is a monitoring unit that determines whether or not a packet received by the first input/output unit 111 or the second input/output unit 112 is normal.

For example, the security monitoring unit 121 uses a whitelist, which is a list of detection rules indicating elements that allows the determination of normality out of the elements of a feature included in the packets, to perform whitelist-based attack detection for determining whether the packets input to the first input/output unit 111 or the second input/output unit 112 are normal. The security monitoring unit 121 then uses a learning model learned through machine learning to perform machine-learning-based attack detection for determining whether or not a packet is normal on the packets that have not been determined to be normal through the whitelist-based attack detection.

Specifically, the security monitoring unit 121 executes whitelist-based attack detection on the packets fed from the relay unit 113 while using the post-selection detection rules stored in the post-selection rule storage unit 120 as a whitelist.

When a packet fed from the relay unit 113 does not fall under the detection rules included in the whitelist, the security monitoring unit 121 executes, on the packet, machine-learning-based attack detection in which feature values of normal packets are preliminary learned from past data and packets deviating from the learned feature values are detected as attacks.

The whitelist-based attack detection and the machine-learning-based attack detection may be those of known techniques, and thus detailed descriptions thereof will be omitted here.

Figure 3:
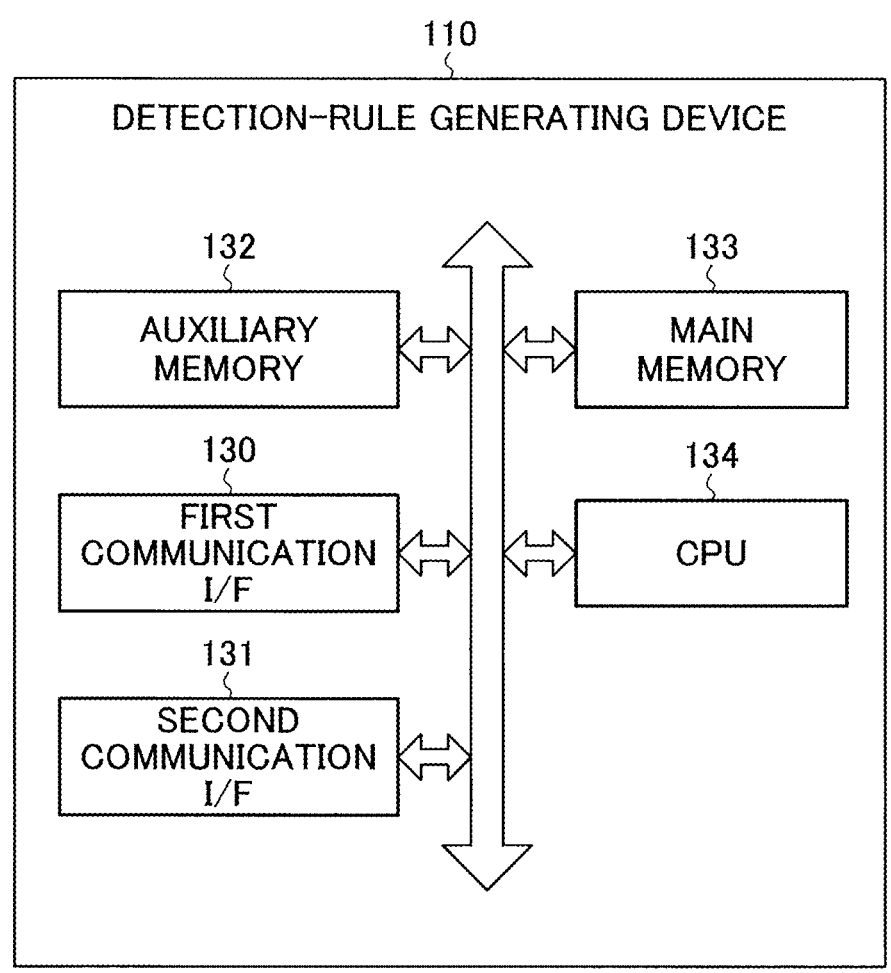
FIG. 3 is a block diagram illustrating a hardware configuration example.

FIG. 3 is a block diagram illustrating a hardware configuration example of the detection-rule generating device 110.

The detection-rule generating device 110 includes a first communication interface (I/F) 130, a second communication I/F 131, an auxiliary memory 132, a main memory 133, and a CPU 134.

The first communication I/F 130 communicates with the Internet 106.

The second communication I/F 131 communicates with the LAN 107.

The auxiliary memory 132 stores information and programs necessary for the detection-rule generating device 110. For example, the auxiliary memory 132 stores the programs executed by the CPU 134. The auxiliary memory 132 also stores the calculation results of the CPU 134.

The main memory 133 provides a work area for the CPU 134. For example, the CPU 134 reads out a program stored in the auxiliary memory 132 into the main memory 133 and executes the program. The CPU 134 loads the packets received by the first communication I/F 130 to the main memory 133.

The CPU 134 reads out a program stored in the auxiliary storage device 132 into the main storage device 133 and executes the program to execute the processing by the detection-rule generating device 110. For example, the CPU 134 performs calculation for generating detection rules based on the packets loaded from the first communication I/F 130 to the main storage device 133.

For example, the first input/output unit 111 can be implemented by the first communication I/F 130, and the second input/output unit 112 can be implemented by the second communication I/F 131.

The pre-selection rule storage unit 115 and the post-selection rule storage unit 120 can be implemented by the auxiliary storage device 132.

The relay unit 113, the detection-rule generating unit 114, the communication statistic calculating unit 116, the detection-rule statistic calculating unit 117, the detection-rule efficiency calculating unit 118, the detection-rule selecting unit 119, and the security monitoring unit 121 can be implemented by the CPU 134.

The above-described programs may be provided via a network or may be recorded and provided on a recording medium. That is, such programs may be provided as, for example, program products.

Figure 4:
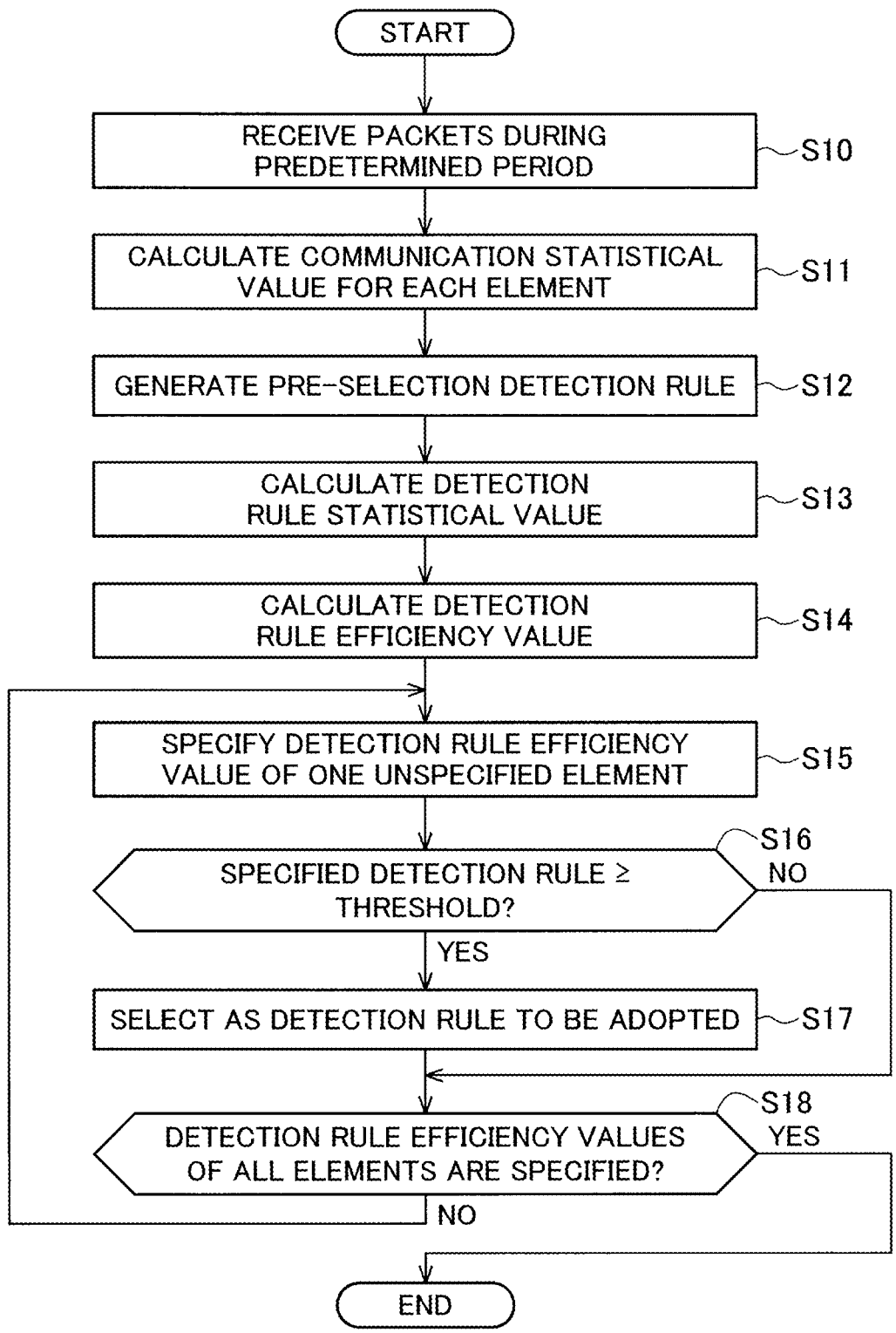
FIG. 4 is a flowchart illustrating the processing executed when the detection-rule generating device according to the first embodiment selects detection rules.

FIG. 4 is a flowchart illustrating the processing executed when the detection-rule generating device 110 according to the first embodiment selects detection rules.

First, the relay unit 113 feeds the packets received by the first input/output unit 111 during a predetermined period to the detection-rule generating unit 114 and the communication statistic calculating unit 116 (step S10). Note that it is presumed that the packets received in this stage do not include attack packets.

The communication statistic calculating unit 116 then calculates a communication statistical value for each element of a predetermined feature, from the packets fed from the relay unit 113 (step S11). The communication statistical value calculated here is fed to the detection-rule efficiency calculating unit 118. Here, as will be described later, each of the various Building Automation and Control networking protocol (BACnet) communication commands is used to calculate the ratio of the number of packets containing the corresponding command to the number of packets received in a predetermined period as a communication statistical value.

The detection-rule generating unit 114 generates pre-selection detection rules that are candidates to be adopted as a whitelist, on the basis of the packets fed from the relay unit 113 (step S12).

FIG. 5 is a schematic diagram for explaining the outline of the processing of generating pre-selection detection rules by the detection-rule generating unit 114.

Here, BACnet communication packets will be described as an example.

The detection-rule generating unit 114 extracts a feature from the packets fed from the relay unit 113. In the example of FIG. 5, the detection-rule generating unit 114 extracts, from the BACnet communication packets, the source IP, the destination IP, the BACnet communication command, and the BACnet communication device ID as features.

Note that in the table illustrated in FIG. 5, the first packet in the "No." column indicates a detection rule for a who-Is command, which is a command element. The second to fourth packets in the "No." column are detection rules for an i-Am command, which is a command element. Thus, the detection rule number for a who-Is command is one, and the detection rule number for an i-Am command is three. Pre-selection detection rules are generated on the basis of the elements of predetermined features out of the features extracted in this way. The generated pre-selection detection rules are stored in the pre-selection rule storage unit 115.

Returning to FIG. 4, the detection-rule statistic calculating unit 117 calculates, from the pre-selection detection rules stored in the pre-selection rule storage unit 115, detection rule statistical values for the respective elements of the predetermined features (step S13). The calculated detection rule statistical values are fed to the detection-rule efficiency calculating unit 118.

The detection-rule efficiency calculating unit 118 uses the communication statistical values for the respective elements fed from the communication statistic calculating unit 116 and the detection rule statistical values for the respective elements fed from the detection-rule statistic calculating unit 117, to calculate detection rule efficiency values for the respective elements of the predetermined features (step S14). The calculated detection rule efficiency values are fed to the detection-rule selecting unit 119.

The detection-rule selecting unit 119 specifies a detection rule efficiency value not yet specified in the detection rule efficiency values for the respective elements fed from the detection-rule efficiency calculating unit 118 (step S15).

The detection-rule selecting unit 119 then determines whether or not the specified detection rule efficiency value is equal to or higher than a threshold (step S16). If the specified detection rule efficiency value is equal to or higher than the threshold (Yes in step S16), the processing proceeds to step S17, and if the specified detection rule efficiency is lower than the threshold (No in step S16), the processing proceeds to step S18.

In step S17, the detection rule involving an element having a detection rule efficiency value equal to or higher than the threshold is selected as a detection rule to be left in the whitelist. The processing then proceeds to step S18.

In step S18, it is determined whether or not a detection rule efficiency value not specified in step S15 remains in the detection rule efficiencies for the respective elements of the predetermined features. If there is an unspecified detection rule efficiency value (Yes in step S18), the processing returns to step S15, and if there is no unspecified detection rule efficiency value (No in step S18), the processing ends.

FIG. 6 is a schematic diagram for explaining example processing executed when the detection-rule selecting unit 119 selects detection rules.

In the example processing, BACnet protocols are extracted from packet dump data of the packets received by the detection-rule generating device 110, and processing is executed on the basis of BACnet communication packets.

Various commands flow through BACnet communication. In this example, BACnet commands are the elements of a predetermined feature.

Pre-selection detection rules are generated with the packets received in a predetermined period by a detection-rule generating device 110, and the detection rule number or the number of detection rules involving corresponding commands and the detection rule number ratio or the ratio of the detection rule number to the number of total detection rules are calculated for each command. Here, the detection rule number ratio is the detection rule statistical value.

Then, the communication volume ratio or the ratio of the communication volume for each command is calculated as the communication statistical value for the packets.

The communication volume ratio is divided by the detection rule number ratio to calculate the detection rule efficiency value. When the detection rule efficiency value calculated as in the above is equal to or higher than a threshold (here, the threshold is 1.00), the detection-rule selecting unit 119 selects the detection rule involving the corresponding command as a detection rule to be left in the whitelist.

According to the first embodiment as described above, since the detection rules having a detection rule efficiency value equal to or higher than a threshold are left in a whitelist, detection rules having high efficiency can be included in a whitelist. Thus, the packets that do not fall under the detection rules in the whitelist can be used for machine learning, so that the total processing time required for attack detection can be suppressed.

Since the detection rule efficiency value is calculated for each element, the storage area for storing the communication volume ratio, etc. can be reduced.

The detection-rule generating device 110 according to the first embodiment is applicable not only to a Building Automation (BA) system performing BACnet communication as described above, but also to a control system in general in which stipulated packets are transmitted, such as a plant control system. Alternatively, the detection rules may be generated by a device other than the detection-rule generating device 110. The device that generates the detection rules may or may not be included in the network system 100.

In the first embodiment described above, the detection rule efficiency value is calculated for each element, but, alternatively, the detection rule efficiency may be calculated for each detection rule.

For example, the communication volume ratio may be the ratio of the number of packets involving a corresponding detection rule to the number of packets fed from the relay unit 113. The detection rule number may be the number of corresponding detection rules in the pre-selection detection rules. The detection rule number ratio may be the ratio of the number of corresponding detection rules to the number of pre-selection detection rules.

Second Embodiment

As illustrated in FIG. 1, a network system 200 including a detection-rule generating device 210 according to the second embodiment includes a PC 101, a router 102, a detection-rule generating device 210, air conditioning equipment 103, lighting equipment 104, and security equipment 105.

The PC 101, the router 102, the air conditioning equipment 103, the lighting equipment 104, and the security equipment 105 of the network system 200 according to the second embodiment are the same as the PC 101, the router 102, the air conditioning equipment 103, the lighting equipment 104, and the security equipment 105, respectively, of the network system 100 according to the first embodiment.

As illustrated in FIG. 2, the detection-rule generating device 210 according to the second embodiment includes a first input/output unit 111, a second input/output unit 112, a relay unit 113, a detection-rule generating unit 114, a pre-selection rule storage unit 115, a communication statistic calculating unit 116, a detection-rule statistic calculating unit 117, a detection-rule efficiency calculating unit 118, a detection-rule selecting unit 219, a post-selection rule storage unit 120, and a security monitoring unit 121.

The first input/output unit 111, the second input/output unit 112, the relay unit 113, the detection-rule generating unit 114, the pre-selection rule storage unit 115, the communication statistic calculating unit 116, the detection-rule statistic calculating unit 117, the detection-rule efficiency calculating unit 118, the post-selection rule storage unit 120, and the security monitoring unit 121 of the detection-rule generating device 210 according to the second embodiment are the same as the first input/output unit 111, the second input/output unit 112, the relay unit 113, the detection-rule generating unit 114, the pre-selection rule storage unit 115, the communication statistic calculating unit 116, the detection-rule statistic calculating unit 117, the detection-rule efficiency calculating unit 118, the post-selection rule storage unit 120, and the security monitoring unit 121, respectively, of the detection-rule generating device 110 according to the first embodiment.

The detection-rule selecting unit 219 selects detection rules having a high detection rule efficiency value as detection rules to be left in a whitelist from the pre-selection detection rules stored in the pre-selection rule storage unit 115. In the first embodiment, the detection-rule selecting unit 119 selects detection rules having a high detection rule efficiency value through comparison with a threshold, but in the second embodiment, the detection-rule selecting unit 219 ranks the elements of a predetermined feature of the pre-selection detection rules in descending order of detection rule efficiency. The detection-rule selecting unit 219 then selects the detection rules to be left in the whitelist from the pre-selection detection rules in descending order of the rank of the element.

The detection-rule selecting unit 219 then stores the selected detection rules in the post-selection rule storage unit 120 as post-selection detection rules.

FIG. 7 is a flowchart illustrating the processing executed when the detection-rule generating device 210 according to the second embodiment selects detection rules.

Among the steps included in the flowchart illustrated in FIG. 7, the steps that are the same as those in FIG. 4 are denoted by the same reference numerals as those in FIG. 4, and detailed descriptions thereof will be omitted.

The processing of steps S10 to S14 in FIG. 7 is the same as the processing of steps S10 to S14 in FIG. 4. However, in FIG. 7, the processing proceeds to step S25 after the processing of step S14.

In step S25, the detection-rule selecting unit 219 ranks the elements fed from the detection-rule efficiency calculating unit 118 in descending order of detection rule efficiency value.

Next, the detection-rule selecting unit 219 calculates, through a predetermined method, a threshold of the detection rule number suitable for being processed through the whitelist-based attack detection, and selects the detection rules to be left in the whitelist from the pre-selection detection rules involving high ranking elements in descending order of rank (step S26). Note that the threshold may be preliminarily determined.

FIG. 8 is a schematic diagram for explaining example processing executed when the detection-rule selecting unit 119 selects detection rules.

In the example processing, BACnet protocols are extracted from packet dump data of the packets received by the detection-rule generating device 210, and processing is executed on the basis of BACnet communication packets.

Pre-selection detection rules are generated with the packets received in a predetermined period by a detection-rule generating device 210, and the detection rule number or the number of detection rules involving corresponding commands and the detection rule number ratio or the ratio of the detection rule number to the number of total detection rules are calculated for each command. Here, the detection rule number ratio is the detection rule statistical value.

Then, the communication volume ratio or the ratio of the communication volume for each command is calculated as the communication statistical value from the packets.

The communication volume ratio is divided by the detection rule number ratio to calculate the detection rule efficiency value.

In the example illustrated in FIG. 8, the detection-rule selecting unit 219 ranks the commands in descending order of detection rule efficiency value calculated by the detection-rule efficiency calculating unit 118.

The detection-rule selecting unit 219 selects pre-selection detection rules involving the commands in descending order of rank of the commands.

The detection-rule selecting unit 219 selects a number of detection rules that satisfies a threshold (which in this case is, for example, 4500). In the example illustrated in FIG. 8, the number of selected detection rules reaches "3160" when the detection rules involving the command "writeProperty-Multiple(REQ)" ranking at ninth are selected. In this case, if the detection rules involving the command "readRange (ACK)" ranking at tenth are selected, the number of selected detection rules reaches "8160" and exceeds the threshold; thus, the detection-rule selecting unit 219 selects the detection rules involving the subsequent command "writeProp-ertyMultiple(REQ)" ranking at eleventh.

Here, if selecting detection rules involving an element of a certain rank causes the threshold to be exceeded, the detection-rule selecting unit 219 lowers the rank so that the number of selected detection rules may be maximized within the threshold. However, the second embodiment is not limited to such an example. For example, if selecting detection rules involving an element of a certain rank causes the threshold to be exceeded, the detection-rule selecting unit 219 may end the selection of detection rules at the preceding rank.

According to the second embodiment as described above, since the detection rules are selected up to a number close to the predetermined threshold, the number of detection rules left in a whitelist can be suppressed.

Note that in the second embodiment, a detection rule efficiency value may be calculated for each detection rule as in the first embodiment.

Third Embodiment

As illustrated in FIG. 1, a network system 300 including a detection-rule generating device 310 according to the third embodiment includes a PC 101, a router 102, a detection-rule generating device 310, air conditioning equipment 103, lighting equipment 104, and security equipment 105.

The PC 101, the router 102, the air conditioning equipment 103, the lighting equipment 104, and the security equipment 105 of the network system 300 according to the third embodiment are the same as the PC 101, the router 102, the air conditioning equipment 103, the lighting equipment 104, and the security equipment 105, respectively, of the network system 100 according to the first embodiment.

Figure 9:
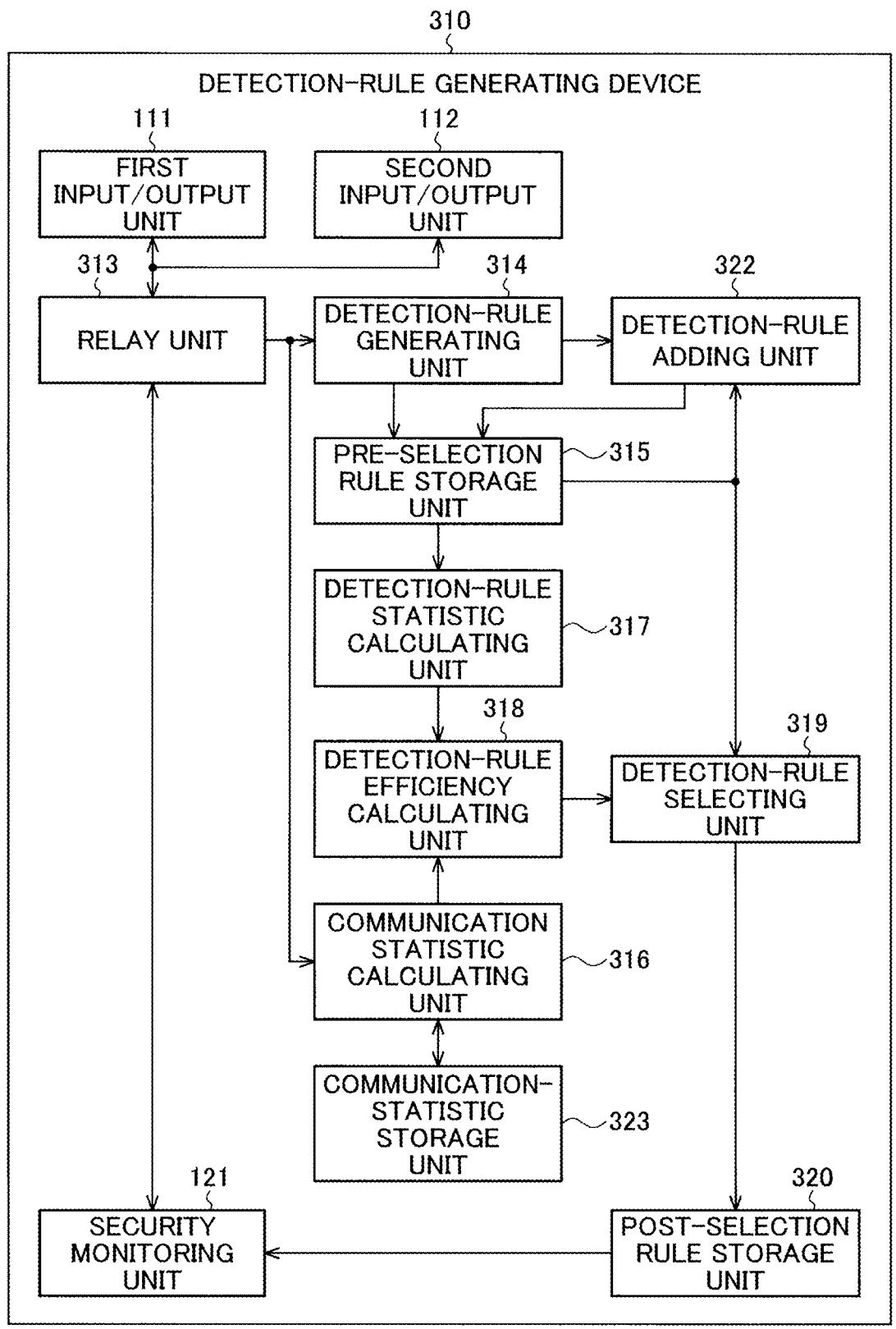
FIG. 9 is a block diagram schematically illustrating the functions of a detection-rule generating device according to a third embodiment.

FIG. 9 is a block diagram schematically illustrating the functions of the detection-rule generating device 310 according to the third embodiment.

The detection-rule generating device 310 includes a first input/output unit 111, a second input/output unit 112, a relay unit 313, a detection-rule generating unit 314, a pre-selection rule storage unit 315, a communication statistic calculating unit 316, a detection-rule statistic calculating unit 317, a detection-rule efficiency calculating unit 318, a detection-rule selecting unit 319, a post-selection rule storage unit 320, a security monitoring unit 121, a detection-rule adding unit 322, and a communication-statistic storage unit 323.

The first input/output unit 111, the second input/output unit 112, and the security monitoring unit 121 of the detection-rule generating device 310 according to the third embodiment are the same as the first input/output unit 111, the second input/output unit 112, and the security monitoring unit 121, respectively, of the detection-rule generating device 110 according to the first embodiment.

The relay unit 313 performs the same processing as that of the first embodiment, and after the detection, rules to be left in the whitelist are selected, feeds the packets received by the first input/output unit 111 to the detection-rule generating unit 314 and the communication statistic calculating unit 316 during a predetermined period, for example, in response to an instruction from an operator or the like of the detection-rule generating device 310. Here, the predetermined period is also referred to as a second period.

The detection-rule generating unit 314 performs the same processing as that of the first embodiment, and generates detection rules from the packets fed from the relay unit 313 after the detection rules to be left in the whitelist are selected. Once the detection rules to be left in the whitelist are selected, the detection-rule generating unit 314 feeds the generated detection rules to the detection-rule adding unit 322.

The detection-rule adding unit 322 adds the detection rules fed from the detection-rule generating unit 314 to the pre-selection rule storage unit 315. For example, the detection-rule adding unit 322 stores the detection rules fed from the detection-rule generating unit 314 in the pre-selection rule storage unit 315 as pre-selection detection rules without overlap with the pre-selection detection rules already stored in the pre-selection rule storage unit 315. Here, the pre-selection detection rules after the addition of the detection rules by the detection-rule adding unit 322 are also referred to as additional pre-selection detection rules.

The pre-selection rule storage unit 315 stores the pre-selection detection rules or the additional pre-selection detection rules.

Before the detection rules to be left in the whitelist are selected, the communication statistic calculating unit 316 calculates, from the packets fed from the relay unit 313, communication statistical values, which are statistical values for the communication of the respective elements of a predetermined feature, in the same manner as in the first embodiment. The communication statistic calculating unit 316 feeds the calculated communication statistical values to the detection-rule efficiency calculating unit 318 while storing them in the communication-statistic storage unit 323.

After selection of the detection rules to be left in the whitelist, the communication statistic calculating unit 316 calculates, from the packets fed from the relay unit 313, the communication statistical values, which are statistical values for communication of the respective elements of a predetermined feature, and adds the calculated communication statistical values to the communication statistical values stored in the communication-statistic storage unit 323. The communication statistic calculating unit 316 feeds the combined communication statistical values to the detection-rule efficiency calculating unit 318 and stores the calculated communication statistical values in the communication-statistic storage unit 323.

The detection-rule statistic calculating unit 317 performs the same processing as that of the first embodiment, and after selection of the detection rules to be left in the whitelist, calculates detection rule statistical values, which are statistical values of detection rules for the respective elements of a predetermined feature, from the additional pre-selection detection rules stored in the pre-selection rule storage unit 315. Here, the calculated detection rule statistical values are also referred to as updated detection rule statistical values.

The detection-rule efficiency calculating unit 318 performs the same processing as that of the first embodiment, and after selection of the detection rules to be left in the whitelist, calculates updated detection rule efficiency values, which are the detection rule efficiencies of the respective elements of a predetermined feature, from the combined communication statistical values and the updated detection rule statistical values. The calculated updated detection rule efficiency values are fed to the detection-rule selecting unit 319.

The detection-rule selecting unit 319 performs the same processing as that of the first or second embodiment, and after selection of the detection rules to be left in the whitelist, selects detection rules having high updated detection rule efficiency values as the detection rules to be left in the whitelist, from the additional pre-selection detection rules stored in the pre-selection rule storage unit 315. The selection method may be the same as of the first or second embodiment. The detection-rule selecting unit 319 then stores the selected detection rules in the post-selection rule storage unit 320 as post-selection detection rules. The post-selection detection rules stored here may also be referred to as updated post-selection detection rules.

Subsequently, the security monitoring unit 121 executes whitelist-based attack detection by using the updated post-selection detection rules stored in the post-selection rule storage unit 320 as a whitelist on the packets fed from the relay unit 113.

Note that the communication-statistic storage unit 323 can be implemented by the auxiliary storage device 132 illustrated in FIG. 3.

The detection-rule adding unit 322 can be implemented by the CPU 134 illustrated in FIG. 3.

Figure 10:
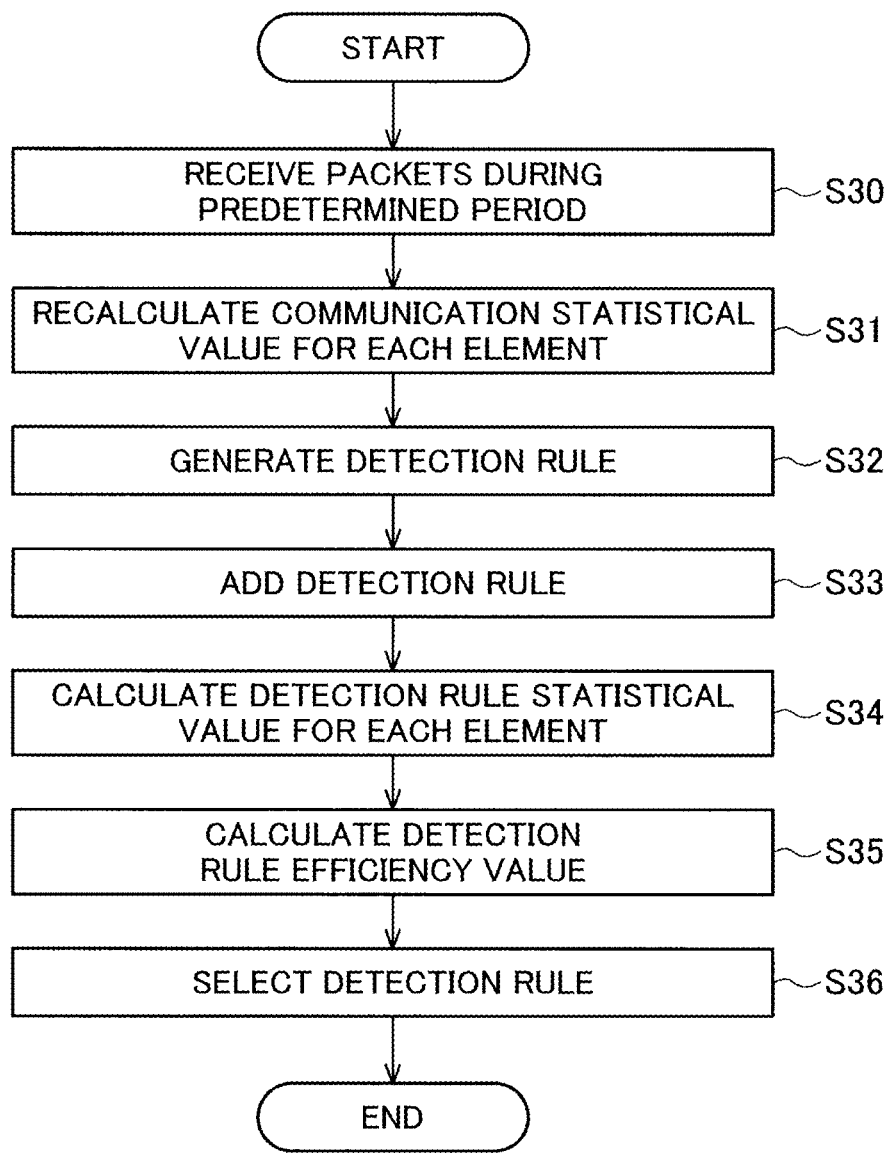
FIG. 10 is a flowchart illustrating processing executed when the detection-rule generating device according to the third embodiment updates the selected detection rules.

FIG. 10 is a flowchart illustrating the processing executed when the detection-rule generating device 310 according to the third embodiment updates selected detection rules.

First, the relay unit 313 feeds the packets received by the first input/output unit 111 during a predetermined period to the detection-rule generating unit 314 and the communication statistic calculating unit 316 (step S30).

The communication statistic calculating unit 316 then calculates the communication statistical values for the respective elements of a predetermined feature from the packets fed from the relay unit 113, and adds the calculated communication statistical values to the communication statistical values stored in the communication-statistic storage unit 323 (step S31). The combined communication statistical values combined here are fed to the detection-rule efficiency calculating unit 318 and stored in the communication-statistic storage unit 323.

The detection-rule generating unit 314 generates detection rules on the basis of the packets fed from the relay unit 313 (step S32). The generated detection rules are fed to the detection-rule adding unit 322.

The detection-rule adding unit 322 adds the detection rules fed from the detection-rule generating unit 314 to the pre-selection rule storage unit 315 so as not to overlap with the pre-selection detection rules already stored in the pre-selection rule storage unit 315 (step S33).

The detection-rule statistic calculating unit 317 calculates, from the additional pre-selection detection rules stored in the pre-selection rule storage unit 315, detection rule statistical values for the respective elements of a predetermined feature as updated detection rule statistical values (step S34). The calculated updated detection rule statistical values are fed to the detection-rule efficiency calculating unit 318.

The detection-rule efficiency calculating unit 318 uses the combined communication statistical values fed from the communication statistic calculating unit 316 and the updated detection rule statistical values fed from the detection-rule statistic calculating unit 317, to calculate the updated detection rule efficiency values, which are the detection rule efficiencies for the respective elements of a predetermined feature (step S35). The calculated updated detection rule efficiency values are fed to the detection-rule selecting unit 319.

The detection-rule selecting unit 319 uses the updated detection rule efficiency values fed from the detection-rule efficiency calculating unit 318 to select, from the additional pre-selection detection rules stored in the pre-selection rule storage unit 315, the detection rules to be left in the whitelist as updated post-selection detection rules (step S36). In this selection method, as in the first embodiment, the updated detection rule efficiency values may be compared with a threshold, and as in the second embodiment, the detection rules may be selected in descending order of updated detection rule efficiencies.

FIG. 11 is a schematic diagram for explaining example processing executed when the detection-rule selecting unit 319 updates the post-selection detection rules.

In the example processing, BACnet protocols are extracted from packet dump data of the packets received by the detection-rule generating device 310, and processing is executed on the basis of BACnet communication packets.

The detection rules generated from the packets received by the detection-rule generating device 310 in a predetermined period are added to the pre-selection detection rules, and the detection rule number or the number of detection rules involving corresponding commands and the detection rule number ratio or the ratio of the detection rule number to the number of total detection rules are calculated for each command. Here, the detection rule number ratio is an updated detection rule statistical value.

Then, the communication volume ratio, which is the ratio of the communication volume for each command, is calculated as a communication statistical value from the packets and added to the corresponding communication statistical value already stored.

The combined communication volume ratio is divided by the updated detection rule number ratio to calculate the updated detection rule efficiency value.

The detection-rule selecting unit 319 selects the additional pre-selection detection rules involving commands having high updated detection rule efficiency values.

As described above, according to the third embodiment, even after a detection rule is selected once, a suitable detection rule can be selected again by adding a new packet. Therefore, the accuracy of the whitelist can be improved.

Note that in the third embodiment, the updated detection rule efficiency value may be calculated for each detection rule as in the first embodiment.

DESCRIPTION OF REFERENCE CHARACTERS 100, 200, 300 network system; 101 PC; 102 router; 103 air conditioning equipment; 104 lighting equipment; 105 security equipment; 106 Internet; 107 LAN; 110, 210, 310 detection-rule generating device; 111 first input/output unit; 112 second input/output unit; 113, 313 relay unit; 114, 314 detection-rule generating unit; 115, 315 pre-selection rule storage unit; 116, 316 communication statistic calculating unit; 117, 317 detection-rule statistic calculating unit; 118, 318 detection-rule efficiency calculating unit; 119, 219, 319 detection-rule selecting unit; 120, 320 post-selection rule storage unit; 121 security monitoring unit; 322 detection-rule adding unit; 323 communication-statistic storage unit.

What is claimed is:

1. A relay device comprising:
a first communication interface connected to a first network;
a second communication interface connected to a second network;
a processor to execute a program; and
a memory to store the program which, when executed by the processor, performs processes of,
determining whether or not a packet input to the first communication interface or the second communication interface is normal; and
outputting a packet determined to be normal to the first communication interface or the second communication interface,
wherein the processor uses a whitelist to perform whitelist-based attack detection to determine whether or not the packet input to the first communication interface or the second communication interface is normal and uses a learning model learned through machine learning to perform machine-learning-based attack detection to determine whether or not a packet not determined to be normal through the whitelist-based attack is normal, the whitelist being a list of detection rules indicating elements that allow determination of normality of the packet out of elements of a feature of the packet, and
the processor further performs processes of,
generating a plurality of detection rules as a plurality of pre-selection detection rules, from a plurality of packets input to the first communication interface during a predetermined first period, the plurality of packets not including any attack packet; and
selecting a detection rule to be included in the whitelist, from the plurality of pre-selection detection rules;
calculating, from the plurality of pre-selection detection rules, for each element of a predetermined feature, a detection rule statistical value indicating a scale of detection rules involving a corresponding element in the plurality of pre-selection detection rules;
calculating, for each element of the predetermined feature, a communication statistical value indicating a scale of packets involving the corresponding element in the plurality of packets; and
calculating, for each element of the predetermined feature, a detection rule efficiency value obtained by dividing the communication statistical value by the detection rule statistical value wherein the processor performs the selection by using the detection rule efficiency value.

2. The relay device according to claim 1, wherein the detection rule statistical value is a ratio of detection rules involving the corresponding element to the plurality of pre-selection detection rules or a number of detection rules involving the corresponding element.

3. The relay device according to claim 1, wherein the communication statistical value is a ratio of packets involving the corresponding element to the plurality of packets.

4. The relay device according to claim 1, wherein the processor further performs processes of,
calculating, for each detection rule included in the plurality of pre-selection detection rules, the detection rule statistical value indicating the scale of corresponding detection rules in the plurality of pre-selection detection rules;

calculating, for each detection rule included in the plurality of pre-selection detection rules, the communication statistical value indicating a scale of corresponding detection rules in the plurality of packets; and calculating, for each element of the predetermined feature, the detection rule efficiency value obtained by dividing the communication statistical value by the detection rule statistical value, wherein the processor performs the selection by using the detection rule efficiency value.

5. The relay device according to claim 4, wherein the detection rule statistical value is a ratio of the corresponding detection rules to the plurality of pre-selection detection rules or a number of corresponding detection rules in the plurality of pre-selection detection rules.

6. The relay device according to claim 4, wherein the communication statistical value is a ratio of packets involving the corresponding detection rules to the plurality of packets.

7. The relay device according to claim 1, wherein the processor performs the selection by comparing the detection rule efficiency value with a predetermined threshold.

8. The relay device according to claim 1, wherein the processor performs the selection in descending order of the detection rule efficiency values.

9. The relay device according to claim 1, wherein,
the processor generates a plurality of detection rules from a plurality of packets input to the first communication interface during a predetermined second period and generates a plurality of additional pre-selection detection rules by adding the plurality of detection rules to the plurality of pre-selection detection rules without overlap, and selects a detection rule to be included in the whitelist from the plurality of additional pre-selection detection rules.

10. The relay device according to claim 2, wherein the communication statistical value is a ratio of packets involving the corresponding element to the plurality of packets.

11. The relay device according to claim 5, wherein the communication statistical value is a ratio of packets involving the corresponding detection rules to the plurality of packets.

12. The relay device according to claim 4, wherein the processor performs the selection by comparing the detection rule efficiency value with a predetermined threshold.

13. The relay device according to claim 4, wherein the processor performs the selection in descending order of the detection rule efficiency values.

14. A relay method comprising:
inputting a packet to a first communication interface connected to a first network or a second communication interface connected to a second network;

determining whether or not a packet input to the first communication interface or the second communication interface is normal; and outputting a packet determined to be normal from the first communication interface or the second communication interface, wherein, when the packet input to the first communication interface or the second communication interface is to be determined to be normal or not, a whitelist is used to perform whitelist-based attack detection to determine whether or not the packet input to the first communication interface or the second communication interface is normal, and a learning model learned through machine learning is used to perform machine-learning-based attack detection to determine whether or not a packet not determined to be normal through the whitelist-based attack detection is normal, the whitelist being a list of detection rules indicating elements that allow determination of normality out of elements of a feature of the packet, the method further comprising:

generating a plurality of detection rules as a plurality of pre-selection detection rules, from a plurality of packets input to the first communication interface during a predetermined first period, the plurality of packets not including any attack packet;

selecting a detection rule to be included in the whitelist, from the plurality of pre-selection detection rules;

calculating, from the plurality of pre-selection detection rules, for each element of a predetermined feature, a detection rule statistical value indicating a scale of detection rules involving a corresponding element in the plurality of pre-selection detection rules;

calculating, for each element of the predetermined feature, a communication statistical value indicating a scale of packets involving the corresponding element in the plurality of packets; and calculating, for each element of the predetermined feature, a detection rule efficiency value obtained by dividing the communication statistical value by the detection rule statistical value wherein the processor performs the selection by using the detection rule efficiency value.

\* \* \* \* \*